United States Patent [19]

Wales

[11] Patent Number: 4,631,917
[45] Date of Patent: Dec. 30, 1986

[54] AIR VALVE FOR IMPROVING THE PERFORMANCE OF AN INTERNAL COMBUSTION ENGINE

[76] Inventor: Desmond E. Wales, 51 Drumbrae South, Edinburgh EH12 8SX, Scotland

[21] Appl. No.: 702,459

[22] Filed: Feb. 19, 1985

[30] Foreign Application Priority Data

Feb. 29, 1984 [GB] United Kingdom ............... 8405277

[51] Int. Cl.⁴ .............................................. F01N 3/00
[52] U.S. Cl. .................................... 60/293; 123/587
[58] Field of Search .............................. 123/585–589; 60/293; 137/454.5, 515.5, 855

[56] References Cited

U.S. PATENT DOCUMENTS

| | | | |
|---|---|---|---|
| 1,038,685 | 9/1912 | Titus et al. | 60/293 |
| 2,854,816 | 10/1958 | Bodine, Jr. | 60/293 |
| 3,253,401 | 5/1966 | Wells | 60/293 |
| 3,630,021 | 12/1971 | Bishop | 60/30 R |
| 3,807,430 | 4/1974 | Keller | 137/855 |
| 3,953,969 | 5/1976 | Mori et al. | 60/293 |
| 4,324,097 | 4/1982 | Schmitt et al. | 60/293 |
| 4,487,662 | 12/1984 | Fishbeck | 137/855 |

FOREIGN PATENT DOCUMENTS 204259 2/1908 Fed. Rep. of Germany .
732162 9/1932 France .

*Primary Examiner*—William A. Cuchlinski, Jr.
*Attorney, Agent, or Firm*—John J. Torrente

[57] ABSTRACT

An air valve for an internal combustion engine, said air valve comprising a valve body (10,19), a passage (27) in said body, valve means adapted to normally close said passage (27) to prevent egress therethrough of spent combustion products from said engine and to open on creation of a pressure drop within the engine to permit air to flow through the passage (27) into the engine. The valve means comprises a flexible valve element (18) engageable with a valve seat (26) associated with said passage (27), and means (17,22) for tensioning said flexible valve element (18) to assist effective operation of the valve element (18).

8 Claims, 6 Drawing Figures

AIR VALVE FOR IMPROVING THE PERFORMANCE OF AN INTERNAL COMBUSTION ENGINE

This invention relates to an air valve for improving the performance of an internal combustion engine.

In an internal combustion (I.C.) engine, power is obtained from the ignition of a fuel/air mixture, and the working cycle comprises a suction or induction stage wherein the air/fuel mixture or air for a compression ignition or fuel injection engine is drawn in to a working chamber of the engine; a compression stage wherein the mixture is compressed by a piston member; an ignition power stage wherein the mixture is ignited (fuel being injected at the beginning of this stage for the compression ignition or fuel injection engine) to cause power motion of the piston member; and an exhaust stage wherein spent combustion gases are expelled from the working chamber. I.C. engines are most commonly of the four-stroke reciprocating piston cylinder type wherein the above-mentioned stages are constituted by four successive strokes of the piston, valve gear including inlet and exhaust valves being provided to control the flow of fuel mixture and burnt gases to and from the cylinder.

In British Patent Application No. 8105704 (Harkness and Halliday), there is disclosed apparatus for improving the performance of an internal combustion engine comprising an air valve whereby air can be admitted to the manifold of an internal combustion engine to afford more complete combustion of the exhaust gases prior to expulsion of the gases from the exhaust. Whilst the valve described in the aforesaid British Patent Application No. 8105704 has proved satisfactory in improving engine performance, the construction and operation of the valve is sensitive to its operating conditions and, particularly where a significant amount of heat is involved, the spring utilised in the valve can easily be damaged to the extent that it may not function efficiently. Also the valve is of relatively complex construction requiring accurate machining of the component parts.

An object of the present invention is to provide an air valve suitable for improving the performance of an internal combustion engine and the construction of which is simpler and less expensive to manufacture than previously proposed arrangements.

According to the present invention there is provided an air valve for an internal combustion engine, said air valve comprising a valve body, a passage in said body, valve means adapted to normally close said passage to prevent egress therethrough of spent combustion products from said engine and to open on creation of a pressure drop within the engine to permit air to flow through the passage into the engine characterised in that said valve means comprises a flexible valve element engageable with a valve seat associated with said passage, and means for tensioning said flexible valve element to assist effective operation of the valve element.

In the four-stroke I.C. engine, it is customary for both the inlet and exhaust valves to be open for a short overlap period of the suction and exhaust stages so that the exhaust duct will be subject to vacuum conditions. Preferably the suction effect created by this vacuum serves to draw additional air into the working chamber or cylinder from the exhaust duct. It is believed that this additional air promotes improvements in the operation of the engine. An air filter is preferably positioned in the path of air flowing to the valve device via the inlet.

An embodiment of the present invention will now be described, by way of example, with reference to the accompanying drawings in which.

Figure 1:
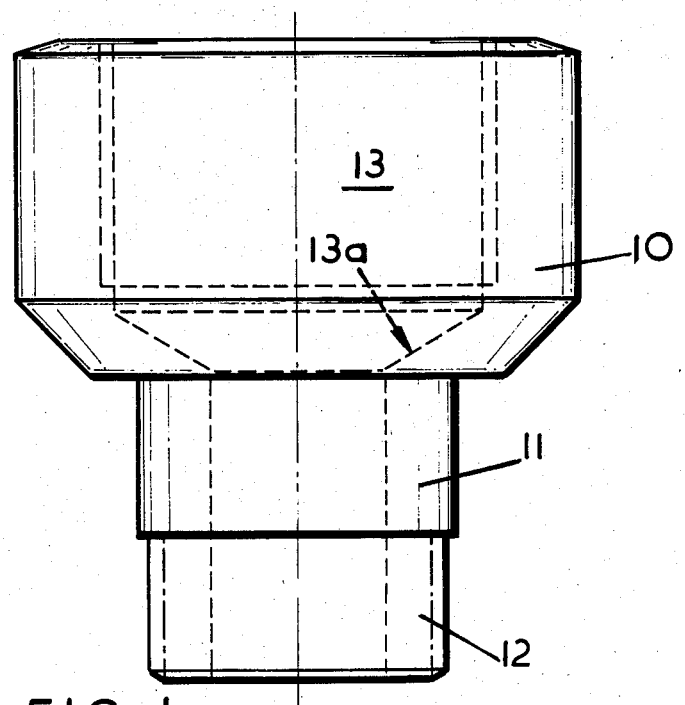
FIG. 1 is a front view of a first portion of a valve body.

Referring to the drawings, an air valve for incorporation in the exhaust manifold of an internal combustion engine comprises a first tubular body portion 10 of mild steel having an integral downward extension 11 which terminates in a screw-threaded portion 12. The screw-threaded portion 12 allows the body portion 10 to be mounted in a co-operating screw-threaded aperture in the exhaust manifold. The exterior of body 10 is hexagonal.

Figure 3:
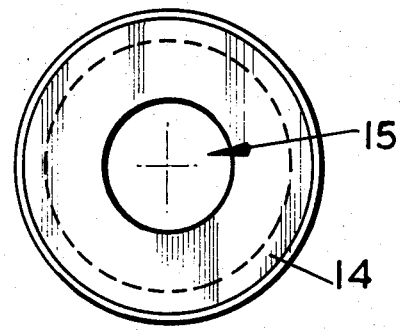
FIG. 3 and FIG. 4 are plan views and end views respectively of a retaining plate for co-operation with the valve holder.
Figure 4:
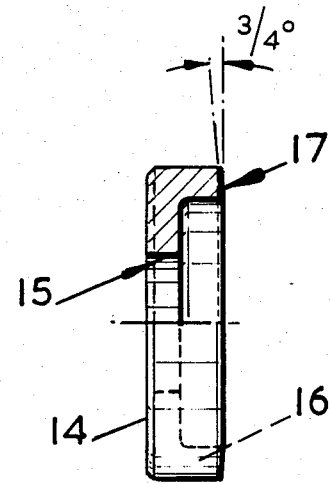

The first portion 10 of the body of the valve has an upper cylindrical internally screw-threaded chamber 13 having a sloping lower wall or guide surface 13a, the chamber 13 being adapted to receive a co-axial retaining plate 14 for a valve element. The retaining plate 14 is illustrated in FIGS. 3 and 4. The retaining plate 14 has a central aperture 15 and has an upwardly-extending peripheral rim 16 terminating in a surface 17 which slopes upwardly from the outer diameter of the rim 16 to its internal diameter and which surface is disposed at an angle to the plane of the base of the plate 14 as shown best in FIG. 4. A suitable angle has been found to be about three quarters of a degree but is shown in exaggerated fashion in FIG. 4 for the sake of clarity.

Figure 5:
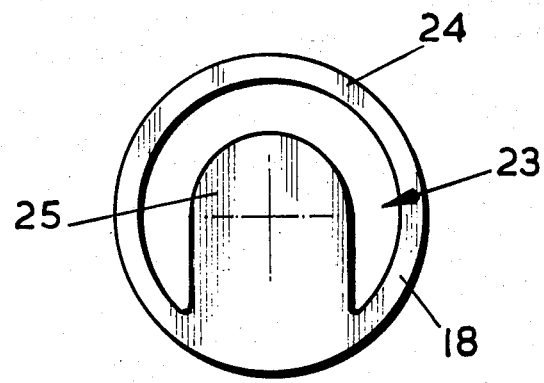
FIG. 5 is a plan view of a valve element.
Figure 6:
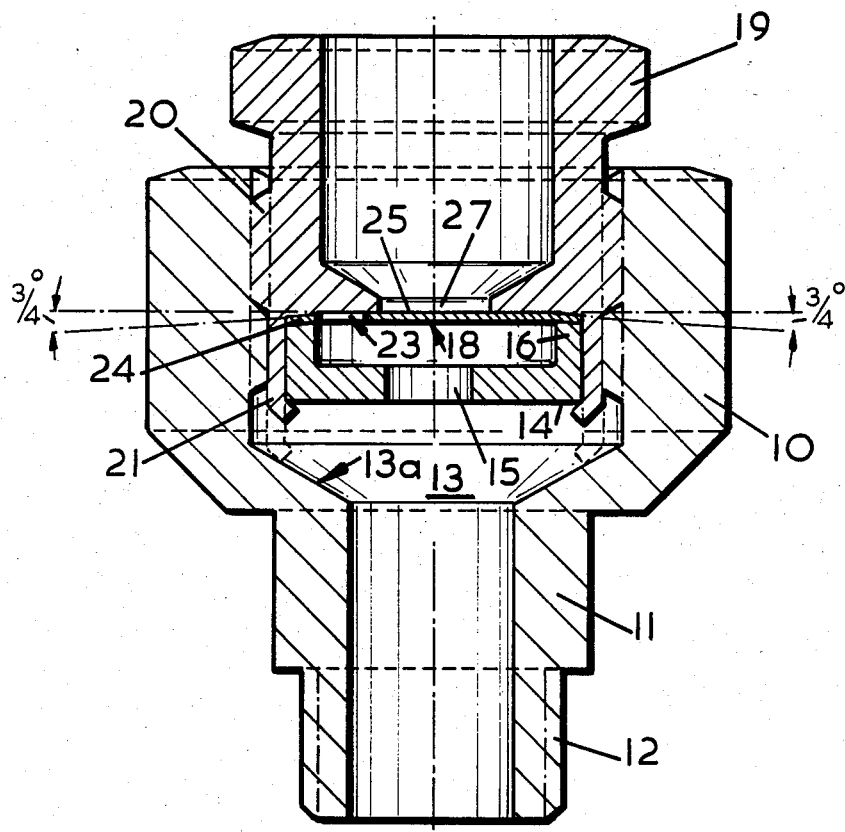
FIG. 6 is a sectional view of the assembled valve.

A flap valve element 18 of general circular configuration as shown in FIG. 5 is disposed and supported adjacent the surface 17 of the retaining plate 14.

Figure 2:
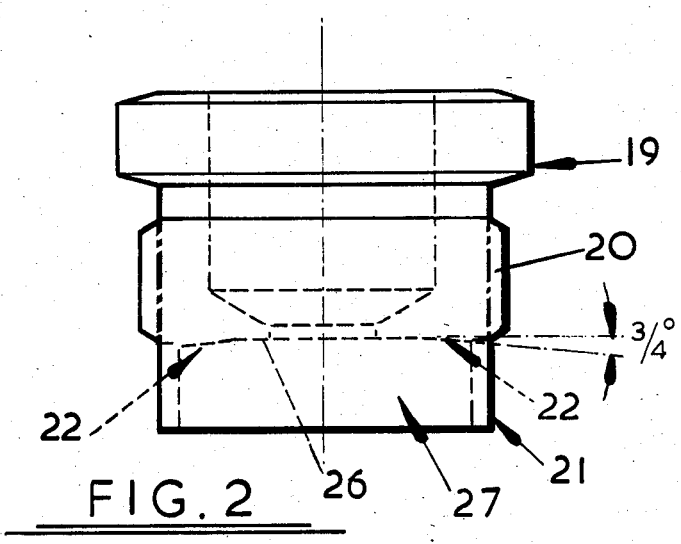
FIG. 2 is a front view of a second body portion or valve holder.

A second body portion or valve holder 19, as shown in FIG. 2 and of a softer material than the mild steel body 10, is provided with an external screw thread 20. The holder 19, which is tubular, is adapted to be screwed into the chamber 13 of the valve body 10 so that lower cylindrical end 21 of the valve holder 19 passes externally of the plate 14. On engagement of the lower end 21 with the sloping lower wall 13a of the body 10, the end 21, being of relatively soft material, is deformed underneath the underside of the plate 14 in order to urge the angled surface 17 of the retaining plate 14 towards angled peripheral surface 22 on the interior of valve holder 19, the surface 22 being disposed at the same angle e.g. three quarters of a degree to the horizontal as the surface 17. The valve element is thus sandwiched between the angled surfaces 17 and 22. Th valve holder can be of any suitable material e.g. brass and is hexagonal at its upper end.

The valve element 18 is of tempered spring steel having a thickness of 0.0043 ins. and as shown in FIG. 5 is of circular form of 16 mm. outside diameter from which an arcuate portion 23 has been cut out to leave a peripheral rim 24 and a central tongue 25 constituting a flap valve which normally seats against a valve seat 26 formed around the bore 27 of the valve holder 19 to close same. It will be noted that there are no sharp corners in the arcuate portion 23.

If desired, the valve element 18 and retaining plate 14 can be positioned within the bore of the valve holder 19 and the lower end preformed around the underside of the plate 14 before the holder 19 is screwed into chamber 13 of body 10.

When the valve holder 19 is screwed into the valve body 10 in order to sandwich the peripheral rim 24 of the valve element 18 between the angled surfaces 17 and 22, the angled nature of the surface causes the valve element to be tensioned to a predetermined extent. The tensioned valve element 18 is sensitive and quick in operation.

It will be noted that the valve when assembled, has a through-bore normally closed by the valve element 18 but opened when vacuum conditions are created in an associated engine cylinder by the valve element 18 lifting from its seat 26 to permit air to flow from atmosphere into the exhaust manifold through bore 27.

If desired a venturi can be provided in the through bore 27 of the assembled valve in order to increase the velocity of air supplied to each associated cylinder.

The particular form of valve described above has been found to be particularly advantageous as compared with valves previously proposed for a similar purpose in that the valve of the present invention operates more quickly and positively and does not require any significant maintenance.

In operation of an engine in which one or more of the valves described above are incorporated, and specifically during the exhaust stage, pulsating pressure conditions exist in the exhaust manifold adjacent each cylinder. Pressure is greatest with the inlet valve closed and can amount to 40 p.s.i. or more and this pressure promotes velocity discharge of gases via the exhaust pipe. During this pressure period, the engine operates conventionally and the valve element 18 of each air valve seats against its seat 26 to prevent discharge of exhaust gases. However, during the overlap period when the exhaust valve has not quite closed and the inlet valve has started to open there is a direct connection between the exhaust manifold and the inlet manifold of the engine. At this stage a vacuum will be created in the working chamber and air will be drawn into the chamber via the air valve and the engine's exhaust manifold. The effect of this additional air is to dilute the exhaust gases and cause a form of air oxidation. Therefore by diluting the contents of the exhaust manifold with clean air, a substantial proportion of the air is drawn into the cylinders from the exhaust manifold one at a time in the same sequence as the engine firing order.

It is contended that this additional air supply will provide a more efficient air/fuel mixture and will result in reduced fuel comsumption. Tests carried out on a motor vehicle using the system of the present invention suggest that a reduction in fuel consumption of the order of around 10 to 15 percent can be achieved. The system in effect operates as a form of combustion rectifier. It is also believed that formation of corrosive combustion products will be reduced, particularly for short-run vehicle use, as will the formation of carbon and sludge deposits in the engine. Additionally, it is contended that a "cleaner" exhaust will result, and this is important since in the interest of avoiding a health hazard there are now severe regulations concerning excessively dirty exhausts from vehicles. In this connection, tests have shown that the carbon monoxide content of the exhaust gases from a vehicle using the invention can be reduced. The air valve members can also be used in diesel (compression ignition) engines, and these members have been found to considerably reduce the smoke in diesel engine exhausts, with more efficient combustion of fuel and more power. It has also been observed that the fuel injection nozzles of the diesel engine have been relatively cleaner after prolonged use.

To provide optimum results with the present invention adjustment of some of the normal engine settings will probably be necessary. For example, the ignition timing may require advancing for example by 5°-10°, and the carburettor should be adjusted to provide a leaner mixture.

The air valve body and other parts may be made for example by investment casting.

Modifications are of course possible in the arrangement. For example, it would be possible to provide a separate slightly pressurised air supply to the air valves although this has the disadvantage of increasing the cost of the installation.

It will be readily apparent that the present invention can be applied to various types of internal combustion engines e.g. vehicle engines, marine engines or industrial engines. In particular it can be applied to diesel engines utilising compression ignition, engines utilising spark ignition or engines incorporating fuel injection system.

In tests carried out on motor vehicles incorporating an air valve as described above, the performance of the engine of the tested vehicles has been improved. For example, whereas previously a drive may have been required to use a plurality of gears in order to climb an incline, he may be able to climb that same incline in top gear when the inventive method is used.

It has been found satisfactory to mount the necessary air valve in the exhaust system but it is conceivable that the valve could be mounted in another location in the engine. For example, it might be mounted on the cylinder block so long as additional air is admitted to the cylinder at the appropriate time. If desirable, the air could be pumped or injected into the cylinder with a suitable timing mechanism.

It has been found that the nearer the air valve is positioned to its associated cylinder or cylinders in the exhaust or outlet from said cylinder or cylinders, the more satisfactory the results which are achieved in the performance of the engine with consequent savings in fuel consumption and reduced levels of exhaust pollution.

What is claimed is:

1. An air valve for an internal combustion engine, said air valve comprising a valve body (10,19), a passage (27) in said body, valve means for normally closing said passage (27) to prevent egress therethrough of spent combustion products from said engine and for opening on creation of a pressure drop within the engine to permit air to flow through the passage (27) into the engine characterised in that said valve means comprises a flexible valve element (18) engageable with a valve seat (26) associated with said passage (27), said flexible valve element (18) being of substantially circular form and having a cut-out portion (23) therein which defines a central tongue forming a flap valve (25), and means for tensioning said flexible valve element (18) to assist effective operation of the valve element (18), said tensioning means comprising a pair of opposed co-operating, angled surfaces (17, 22) associated with the valve body (10, 19) and engaging the periphery of the valve element (18) on assembly of the air valve in order to tension said valve element (18), the angle of said co-operating surfaces (17, 22) being about three quarters of a degree to the plane of the valve element (18) before it is tensioned.

2. An air valve as claimed in claim 1 in which the valve body comprises a first portion (10) adapted to be screw-threadedly mounted in an engine, a second portion (19) screw-threadedly secured to said first portion, and a guide surface 13a on at least one of said portions urging said co-operating angled surfaces towards each other in order to tension the valve element therebetween.

3. An air valve as claimed in claim 1, in which the periphery of the valve element (18) is constituted by a rim (24) which is integrally connected to flap valve (25).

4. An air valve as claimed in claim 3, in which the valve body comprises a first portion (10) adapted to be screw-threadedly mounted in an engine, a second portion (19) screw-threadedly secured to said first portion, and a guide surface 13a on at least one of said portions urging said co-operating angled surfaces towards each other in order to tension the valve element therebetween.

5. An air valve as claimed in any of the claims 1, 2, 3 or 4, in which one of said co-operating angled surfaces is provided on a valve-retaining member (14) separate from said valve body (10, 19).

6. An air valve as claimed in claim 5, in which the valve element (18) is of tempered spring steel.

7. An air valve as claimed in in any of the claims 2, 3 or 4, in which the valve element (18) is of tempered spring steel.

8. An air valve as claimed in claim 1, in which the valve element (18) is of tempered spring steel.

* * * * *